United States Patent [19]

Nojima et al.

[11] Patent Number: 5,139,657

[45] Date of Patent: * Aug. 18, 1992

[54] MULTIPLE-GAS-PHASE SETTLING TANK

[75] Inventors: Youko Nojima; Hisatake Nojima, both of Kagoshima, Japan

[73] Assignee: Yuugen Kaisha Parasight, Chiba, Japan

[*] Notice: The portion of the term of this patent subsequent to Oct. 8, 2008 has been disclaimed.

[21] Appl. No.: 623,450

[22] PCT Filed: Oct. 13, 1989

[86] PCT No.: PCT/JP89/01054

§ 371 Date: Dec. 7, 1990

§ 102(e) Date: Dec. 7, 1990

[87] PCT Pub. No.: WO90/04444

PCT Pub. Date: May 3, 1990

[30] Foreign Application Priority Data

Oct. 14, 1988 [JP] Japan .................. 63-258977

[51] Int. Cl.$^5$ .............................................. B01D 21/02
[52] U.S. Cl. ................................. 210/151; 210/207; 210/521; 261/113; 261/123
[58] Field of Search .............. 210/150, 151, 521, 522, 210/202, 220; 261/108, 113, 114.1, 123; 220/501, 554

[56] References Cited

U.S. PATENT DOCUMENTS

| | | | |
|---|---|---|---|
| 362,234 | 5/1887 | Stauber | 261/123 |
| 1,817,649 | 8/1931 | Rumsey | 210/522 |
| 2,009,510 | 7/1935 | Mobley | 210/521 |
| 2,153,507 | 4/1939 | Mann, Jr. | 261/108 |
| 2,261,101 | 10/1941 | Erwin | 210/522 |
| 2,354,856 | 8/1944 | Erwin | 210/522 |
| 2,443,686 | 6/1948 | Malmgren | 210/522 |
| 2,515,090 | 7/1950 | Linder | 261/113 |
| 2,727,882 | 12/1955 | Vodonik | 261/114.1 |
| 2,824,728 | 2/1958 | Crawford | 261/121.2 |
| 3,421,335 | 1/1969 | Becker | 261/113 |

FOREIGN PATENT DOCUMENTS

| | | |
|---|---|---|
| 2253919 | 5/1974 | Fed. Rep. of Germany . |
| 4426634 | 11/1969 | Japan . |
| 48-15971 | 5/1973 | Japan . |
| 60-118292 | 6/1985 | Japan . |
| 63-328499 | 2/1988 | Japan . |
| 18208 | of 1896 | United Kingdom . |

*Primary Examiner*—Stanley S. Silverman
*Assistant Examiner*—Christopher Upton
*Attorney, Agent, or Firm*—Jordan and Hamburg

[57] ABSTRACT

A multi-gas-phase settling tank has a plurality of containers mounted upside down in vertical spaced relation at fixed intervals for holding a predetermined quantity of gas under water. Each container has a flat horizontal wall, side walls extending downwardly therefrom, a vent port in the flat horizontal wall and a hollow projection extending downwardly from the vent port for a shorter distance than the height of the side walls. The containers can be mounted at their corners in relation to each other or on inner walls of a settling tank.

5 Claims, 2 Drawing Sheets

FIG. 1
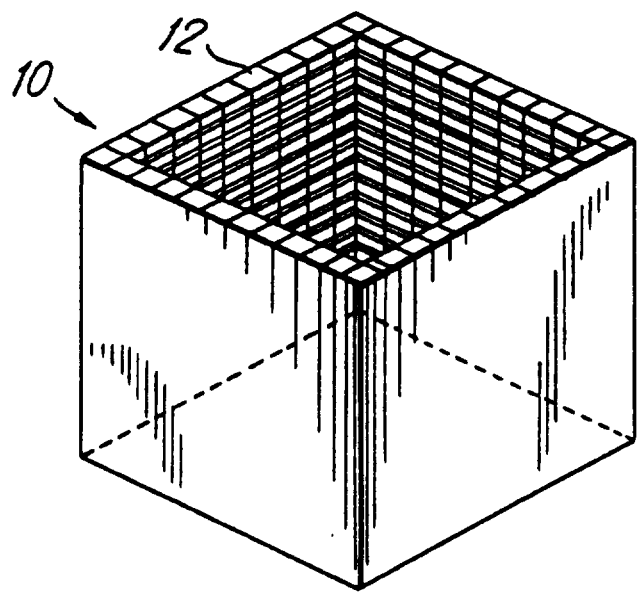
FIG. 2a
FIG. 2
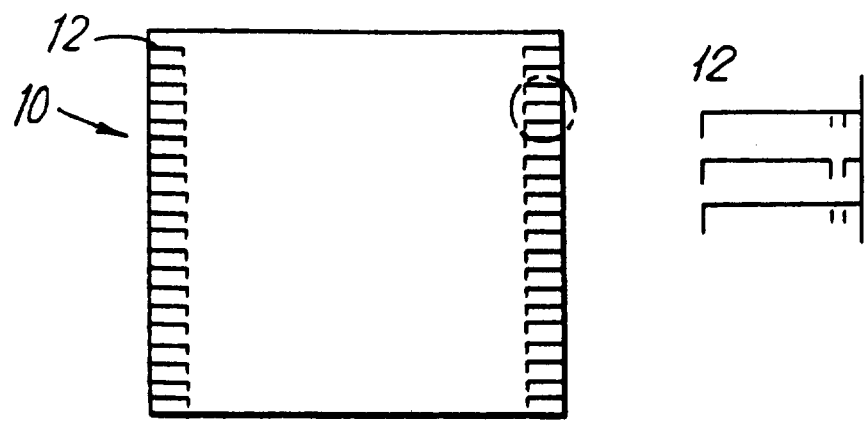

MULTIPLE-GAS-PHASE SETTLING TANK

BACKGROUND OF THE INVENTION

According to the conventional technology, maintaining an aerobic condition and settling solid matters in water have not been accomplished at the same time. More particularly, when it is desired to supply oxygen into water, there has been no alternative other than letting air pass through the water in a bubbling manner on a large scale. On the other hand, the settlement of solid matters is done by keeping the water stationary or by causing a centrifugal motion of the water. These two phenomena can not occur at the same time. Considering the sewage treatment currently carried out as a concrete example, treated water through an aeration tank contains a large number of microorganisms and small metazoans and is in great demand of oxygen. Accordingly, in a precipitation or settling tank, it is inevitable that oxygen in the treated water is used up in a short period of time and the treated water comes to a state of containing no oxygen. As concerns supplying oxygen while removing carbonic acid gas, according to the conventional technology, any measures except ventilation with strong stirring of water have been considered to be impossible.

The present invention is an apparatus which can perform settlement in an aerobic manner.

Letting air effectively pass through water has been considered to be best for bringing the water to an aerobic condition, and to bring about such a condition involves stirring of the water. On the other hand, when causing settlement, water has to be kept stationary and, therefore, it is impossible to let air pass therethrough. However, the applicant of the present invention has filed another international application entitled "MULTIPLE-GAS-PHASE BREEDING METHOD" (PCT/JP88/00925). In that application, a new method of supplying oxygen into water, or a ventilation method which is sure and involves less stirring effect, has been proposed. The method proposes holding air in plural piles under water to physically increase a contact surface area between the air and water. This method has the characteristic feature that natural water surfaces are artificially provided under water in countless numbers and, at the same time, breeding places for life are countlessly provided.

SUMMARY OF THE INVENTION

The present invention is a multiple gas-phase settling tank characterized by a container group which is composed of flat containers each fixed horizontally and upside down for a purpose of holding a predetermined quantity of gas under water, a number of which containers are arranged vertically in multiple stages at fixed intervals, and hollow projections provided on vent ports of the respective containers of the container group, which vent ports are respectively formed in parts of bottoms (corresponding to upper partitions) of the containers, which hollow projections protrude downward for shorter distances than the heights of side walls of the containers and are in communication with the respective vent ports. Further, the invention can employ a multiple-gas-phase settling tank wherein, in the above-mentioned container group, in spaces of fixed intervals existing between adjacent upper and lower containers, which spaces, under water, make passages for allowing water to freely come in and out partitions are provided to block part of the spaces to limit the entrance and exit of water.

When the invention is put in operation in a tank, the following occurs. The respective containers of the container group are fixed upside down at fixed intervals within the tank and, when ventilating the lowermost container, a fixed quantity of the gas is held therein for the height of the hollow projection. Gas in excess of the fixed quantity ascends through the hollow projection, which is in communication with the vent port, to be held in the upper containers again. This means that, when continuously ventilating the lowermost container, all the upper containers can be ventilated in order through the hollow projections thereof. It should particularly be noted that the ascent at this time is not such that the gas of a quantity overflowing the lower container ascends continuously little by little into the upper container but such that the gas exceeding the fixed quantity is once accumulated and, then, intermittently ascends with force through the pipe. This is a phenomenon wherein the gas ascends after increasing over the height of the pipe due to the effect of the surface tension of water. The above implies that the levels of the artificial water surface made in the containers vary up and down in accordance with the ventilation, and that partial flows of water surely occur in the containers. In other words, the effect is as if a small pump is provided between adjacent upper and lower containers. As concerns the water between them, when making air pass therethrough, it is possible to let oxygen dissolve and remove carbonic acid gas. A pumping force acting in a horizontal direction, in the water within the tank, brings about a horizontal stirring effect and contributes to the transfer of the water all over the region of the tank, which water is completed with gas exchange between carbonic acid gas and oxygen. Further, a matter of importance in the invention is that, since a stirring force in a vertical direction is hardly caused, settlement easily occurs in the tank while maintaining an aerobic condition therein.

BRIEF DESCRIPTION OF THE DRAWINGS

To describe the invention in more detail, description will be made thereof in conjunction with the accompanying drawings, in which:

FIG. 1 is a perspective view of a tank according to one embodiment of the present invention;

FIG. 2 is a vertical cross-sectional view taken centrally of FIG. 1;

FIG. 2a is an enlarged sectional view of a portion of FIG. 2;

DESCRIPTION OF THE PREFERRED EMBODIMENTS

FIG. 1 is a perspective view showing the external appearance of a tank according to a first embodiment of the invention. In the tank, generally indicated at 10, a group of containers 12 are fixed to inner side walls of the tank. The fixation of the container group may be made at any portion of the tank 10. FIG. 2 is a vertical cross-sectional view taken at the center of FIG. 1. FIG.

3 is a perspective view of an assembly in which five containers 16 of the same size are fixed upside down parallel to one another at their four corners. FIG. 4 is a cross-sectional view taken at the center of FIG. 3. There are provided hollow projections 18 in staggered relation to one another, which are vent ports.

Figure 3:
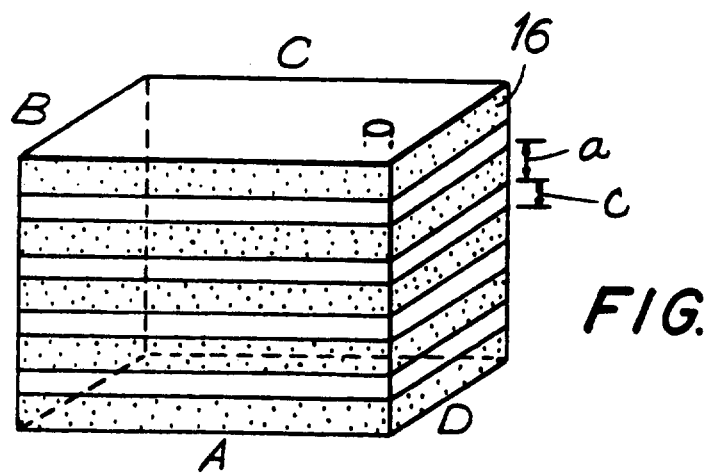
FIG. 3 is a perspective view of a tank according to another embodiment of the present invention.
Figure 4:
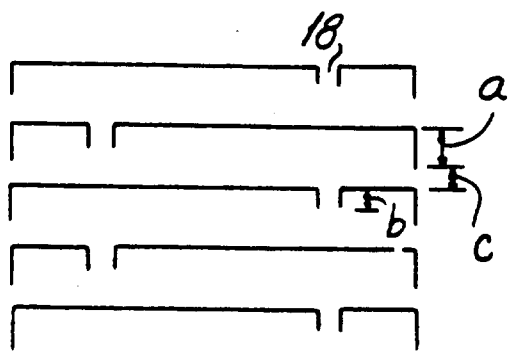
FIG. 4 is a vertical cross-sectional view taken centrally of FIG. 3.

In FIGS. 3 and 4, a, b and c represent, respectively, the height of a side wall of the container 16, the height of the hollow projection 18 (being in communication with the vent port), and an interval between adjacent upper and lower containers. The apparatus of the invention wherein a is set to 1.5 cm, b to 0.5 cm and c to 1.0 cm is preferred.

Figure 5:
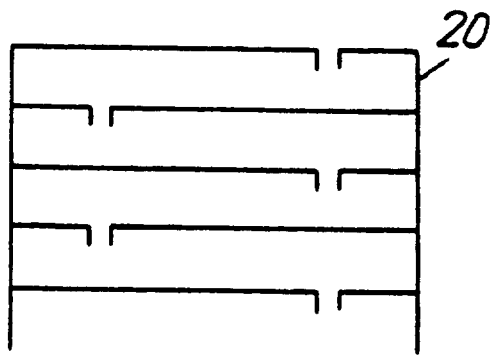
FIG. 5 is a vertical cross-sectional view of a modification to the FIG. 3 embodiment.

FIG. 5 is cross-sectional view of an embodiment where partitions 20 are provided in the intervals between the adjacent upper and lower containers of FIG. 3, or in spaces for allowing water to come in and out, to block part of the intervals so that communication of spaces on both sides of the containers is broken to limit the spaces through which water comes in and out.

A direction or directions in which a small pumping effect or operation between the respective containers acts, when all outside faces (B, C, and D) except one outside face A in FIG. 3 are respectively formed of single continuous faces, or when partitions are provided to block the spaces between adjacent upper and lower containers, become such as shown in the cross-sectional view of FIG. 5. When continuously ventilating, water comes in and out through the front face (the outside A) only. The pumping forces concentrate at the front face (the outside A) and the direction o flow of water is fixed to be controlled with ease. The assembly shown in FIG. 5 is used as a container group which is provided inside the tank shown in FIG. 1.

When considering the environment in the containers of the present invention, there is a biological feature that a countless number of plates are just under the surface of water. Life, ranging from large metazoans to microorganisms, tends to become active in fission and movement when lying on the ground. Usually, however, oxygen in water is used up in a short period of time and, therefore, it is impossible for the life to keep lying on the ground. In this case, if there is always plenty of oxygen just under the surface of the water, it is most convenient for the existence and propagation of the life. This is the same condition as the original environment of the seashore where the life was born. Also, from this point of view, it is notable that the invention is effective for the culture of microorganisms.

In sewage treatment using the tank of the present invention, it is possible to perform a biological oxidation treatment in an aerobic manner through the process of settling. Breeding fish and shells can be accomplished at the center of the tank of the present invention in a three-dimensional manner. In this case, there is an advantage in that the remains of feed and excreta settle naturally. The invention is usable for the culture of a great number of microorganisms.

We claim:

1. A multiple-gas-phase settling tank comprising a tank having a plurality of flat tank side walls with at least two of said flat tank side walls being disposed in spaced parallel relationship, a plurality of flat containers fixed to each of said tank side walls in vertical and parallel spaced relationship at fixed intervals for holding a predetermined quantity of gas under water, each of said containers comprising a flat horizontal wall extending inwardly of said tank side walls, each of said flat horizontal walls having an inner termination edge, each of said containers further comprising a downward depending wall extending downwardly from said inner terminating edge of said flat horizontal wall, each of said downward depending walls having a vertical height with a lower terminating end spaced from the flat horizontal wall of the next lower container, said containers further comprising a vent port opening in said flat horizontal wall and a vent pipe connected to said flat horizontal wall at said vent port, said vent pipe extending downwardly from said flat horizontal wall, said vent pipe having a vertical length which is less than said vertical height of said downward depending walls, said two flat tank side walls which are disposed in parallel relationship being spaced from one another a first horizontal distance, said downwardly depending walls of the containers fixed to said two parallel tank side walls being parallel to one another and being spaced from one another a second horizontal distance which is less than said first horizontal distance, whereby the space between said downwardly depending walls of the containers fixed to said two parallel tank side walls define at least part of a central vertical through passage in said tank.

2. A multi-gas-phase settling tank according to claim 1, wherein another two of said flat tank side walls are disposed in spaced parallel relationship, said other two flat tank side walls which are disposed in parallel relationship being spaced from one another a third distance, said downwardly depending walls of the containers fixed to said other two parallel tank side walls being parallel to one another and being spaced from one another a fourth horizontal distance which is less than said third horizontal distance, whereby the space between said downwardly depending walls of the containers fixed to said other two parallel tank side walls define another part of said central vertical through passage in said tank.

3. A multiple-gas-phase settling tank comprising a tank having a plurality of flat tank side walls, a plurality of flat containers fixed to said tank in vertical and parallel spaced relationship at fixed intervals for holding a predetermined quantity of gas under water, each of said containers comprising a flat horizontal wall extending inwardly of said tank, each of said flat horizontal walls having outer peripheral edges, each of said containers further comprising a downward depending wall extending downwardly from said outer peripheral edges of said flat horizontal wall, each of said downward depending walls having a vertical height, said containers further comprising a vent port opening in said flat horizontal wall and a vent pipe connected to said flat horizontal wall at said vent port, said vent pipe extending downwardly from said flat horizontal wall, said vent pipe having a vertical length which is less than said vertical height of said downward depending walls, each of said downwardly depending walls of each container having a lower terminating end, each of said lower terminating ends being spaced from the flat horizontal wall of the next lower container.

4. A multiple-gas-phase settling tank according to claim 3, wherein the vent port and vent pipe of one container are offset and thereby staggered relative to the vent port and vent pipe of the containers overlying and underlying said one container.

5. A multiple-gas-phase settling tank comprising a tank having a plurality of flat tank side walls, a plurality of flat containers fixed to said tank in vertical and parallel spaced relationship at fixed intervals for holding a predetermined quantity of gas under water, each of said containers comprising a flat horizontal wall extending inwardly of said tank, each of said flat horizontal walls having outer peripheral edges, each of said containers further comprising a downward depending walls extending downwardly from said outer peripheral edges of said flat horizontal wall, at least one of said downward depending walls having a first vertical height, said containers further comprising a vent port opening in said flat horizontal wall and a vent pipe connected to said flat horizontal wall at said vent port, said vent pipe extending downwardly from said flat horizontal wall, said vent pipe having a vertical length which is less than said first vertical height of said at least one downward depending walls, at least some other of said downward depending walls of one container having a second vertical height greater than said first vertical height and which extend to and are connected to the underlying flat horizontal wall of an underlying container.

* * * * *